United States Patent
Ishizawa (10) Patent No.: US 11,874,490 B2
(45) Date of Patent: Jan. 16, 2024

(54) DISPLAY APPARATUS

(71) Applicant: Alps Alpine Co., Ltd., Tokyo (JP)

(72) Inventor: Yasuhiro Ishizawa, Miyagi-ken (JP)

(73) Assignee: Alps Alpine Co., Ltd.

( * ) Notice: Subject to any disclaimer, the term of this patent is extended or adjusted under 35 U.S.C. 154(b) by 0 days.

(21) Appl. No.: 17/988,801

(22) Filed: Nov. 17, 2022

(65) Prior Publication Data

US 2023/0071665 A1     Mar. 9, 2023

Related U.S. Application Data

(63) Continuation of application No. PCT/JP2021/019840, filed on May 25, 2021.

(30) Foreign Application Priority Data

Jul. 31, 2020   (JP) ................... 2020-130499

(51) Int. Cl.
  F21V 8/00       (2006.01)
(52) U.S. Cl.
  CPC .......... G02B 6/006 (2013.01); G02B 6/0091 (2013.01)
(58) Field of Classification Search
  CPC ......... G02B 6/0071; G02B 6/91; G02B 6/006
  See application file for complete search history.

(56) References Cited

U.S. PATENT DOCUMENTS

| | | | |
|---|---|---|---|
| 2012/0314397 A1* | 12/2012 | Nozaki | H01H 19/025 362/23.14 |
| 2016/0161105 A1 | 6/2016 | Cheng et al. | |
| 2017/0060062 A1 | 3/2017 | Araishi | |
| 2023/0071665 A1* | 3/2023 | Ishizawa | H01H 9/167 |

FOREIGN PATENT DOCUMENTS

| | | |
|---|---|---|
| JP | 54-60470 B2 | 4/2014 |
| JP | 2017-045655 A | 3/2017 |
| WO | 2018-131137 A1 | 7/2018 |

OTHER PUBLICATIONS

Innovation Q+ NPL Search (Year: 2023).*
International Search Report (English translation) for corresponding International Application No. PCT/JP2021/019840, dated Aug. 17, 2021 (2 Pages).

* cited by examiner

Primary Examiner — Anabel Ton
(74) Attorney, Agent, or Firm — Harness, Dickey & Pierce, P.L.C.

(57) ABSTRACT

A display apparatus includes a light source, a display unit including a light-transmissive portion having a predetermined design shape, and a light guide that guides light emitted from the light source to the light-transmissive portion. The display unit enables the design shape to be visually recognized when the light emitted from the light source is applied. The light guide includes a radiating portion that applies the light emitted from the light source toward the light-transmissive portion, a first peripheral wall, a second peripheral wall, an upper wall, and an outer peripheral wall. Each of the radiating portion, the first peripheral wall, the second peripheral wall, the upper wall, and the outer peripheral wall is integral to the light guide. Each or all of the first peripheral wall, the second peripheral wall, the upper wall, and the outer peripheral wall are supporting portions that support the radiating portion.

4 Claims, 6 Drawing Sheets

DISPLAY APPARATUS

CLAIM OF PRIORITY

This application is a Continuation of International Application No. PCT/JP2021/019840 filed on May 25, 2021, which claims benefit of Japanese Patent Application No. 2020-130499 filed on Jul. 31, 2020. The entire contents of each application noted above are hereby incorporated by reference.

BACKGROUND OF THE INVENTION

1. Field of the Invention

The present invention relates to display apparatuses and, in particular, to a display apparatus in which a design shape irradiated by a light source is not visually recognized when the light source is off.

2. Description of the Related Art

International Publication No. WO2014/129577 discloses a configuration for a display apparatus in which a design shape on an operation panel is visually recognized when a light source is on and is not visually recognized when the light source is off, the configuration being such that light emitted from the light emitting source is applied to an irradiated portion via a light guide and a diffusing member which are disposed between the light emitting source and the irradiated portion.

However, it is difficult for the technique disclosed in WO2014/129577 to enhance the ease of assembly because the light guide and the diffusing member are separate members, and another member for supporting the light guide at a predetermined height is needed, which results in a relatively large number of components.

SUMMARY OF THE INVENTION

A display apparatus according to an aspect of the present invention includes a light source, a display unit including a light-transmissive portion having a predetermined design shape, the display unit enabling the design shape to be visually recognized when light emitted from the light source is applied from a bottom surface and passes through the light-transmissive portion, and a light guide that guides the light emitted from the light source to the light-transmissive portion. The light guide includes a radiating portion opposed to the light-transmissive portion at a position adjacent to a bottom surface of the display unit, the radiating portion applying the light emitted from the light source toward the light-transmissive portion, a first peripheral wall enclosing a first space between the radiating portion and the light source, a second peripheral wall enclosing a second space between the radiating portion and the light-transmissive portion, an upper wall connecting to the second peripheral wall and extending outside the second space, and an outer peripheral wall connecting to the upper wall and extending toward the bottom surface. Each of the radiating portion, the first peripheral wall, the second peripheral wall, the upper wall, and the outer peripheral wall is integral to the light guide. Each or all of the first peripheral wall, the second peripheral wall, the upper wall, and the outer peripheral wall are supporting portions that support the radiating portion.

According to an embodiment, a display apparatus in which a predetermined design shape is visually recognized when the light source is on and is not visually recognized when the light source is off can be reduced in the number of components, and the ease of assembly can be improved.

DESCRIPTION OF THE PREFERRED EMBODIMENTS

An embodiment of the present invention will be described hereinbelow with reference to the drawings.

Outline of Display Apparatus 100

Figure 1:
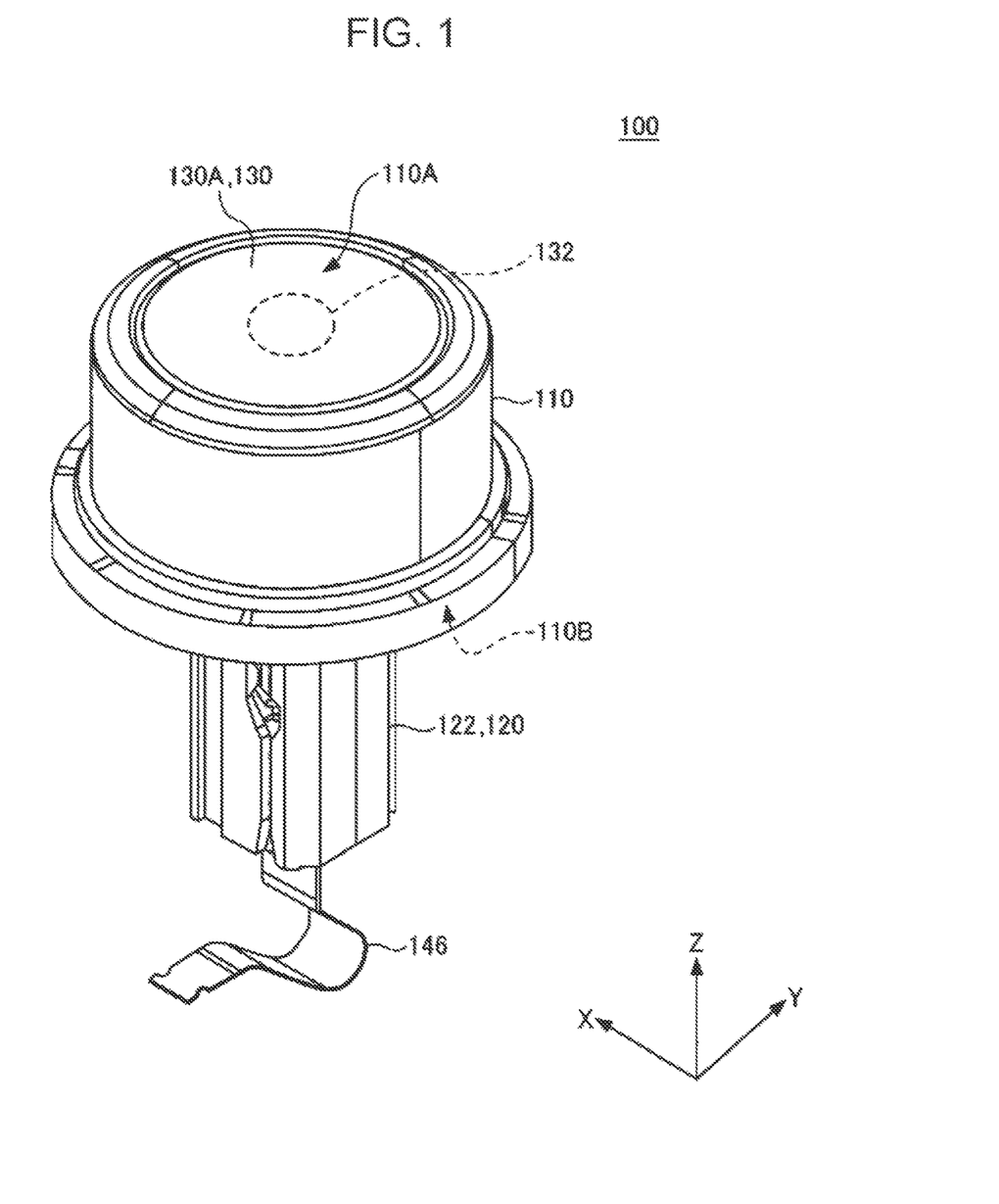
FIG. 1 is an external perspective view of a display apparatus according to an embodiment.
Figure 2:
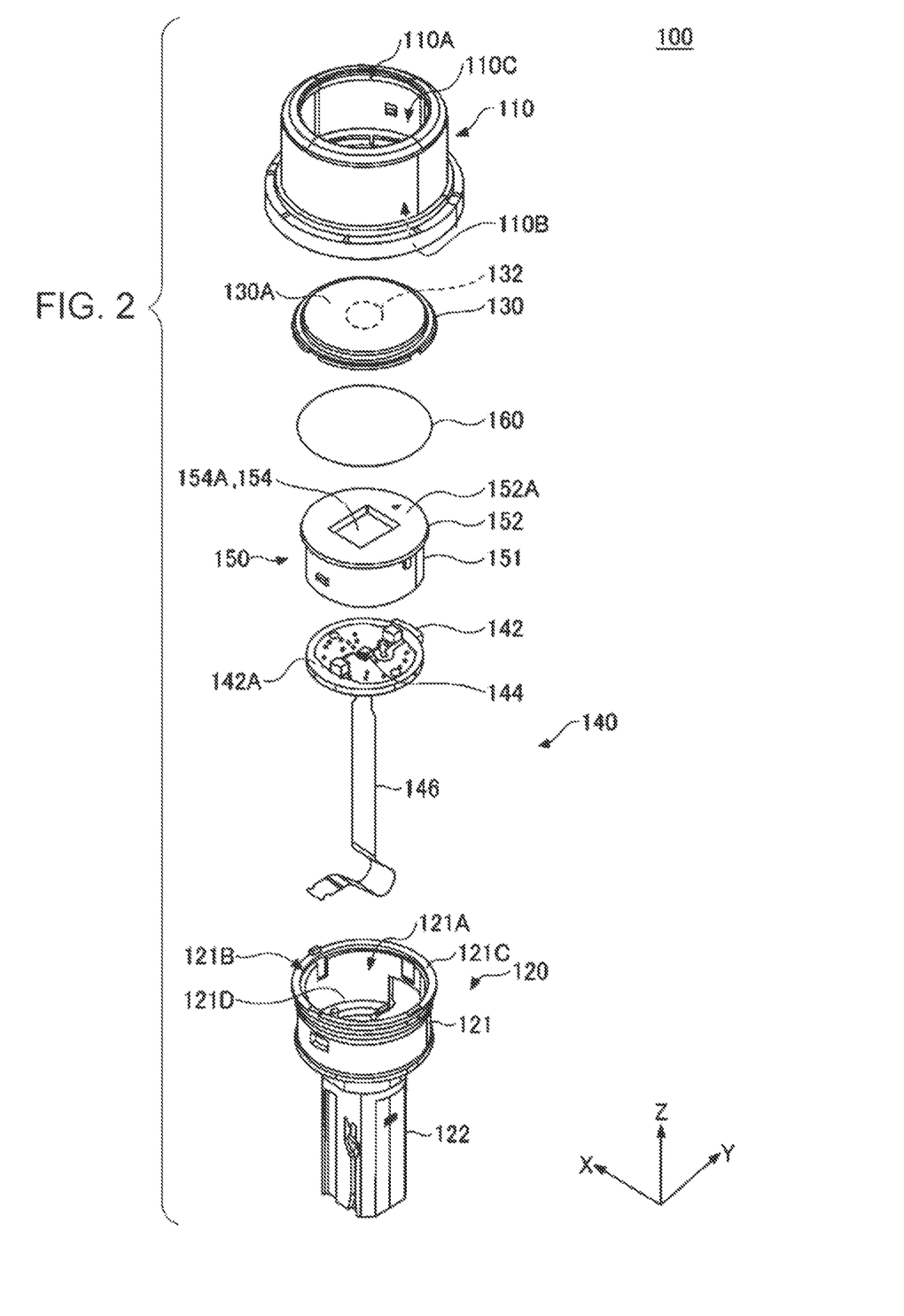
FIG. 2 is an exploded perspective view of the display apparatus according to an embodiment.
Figure 3:
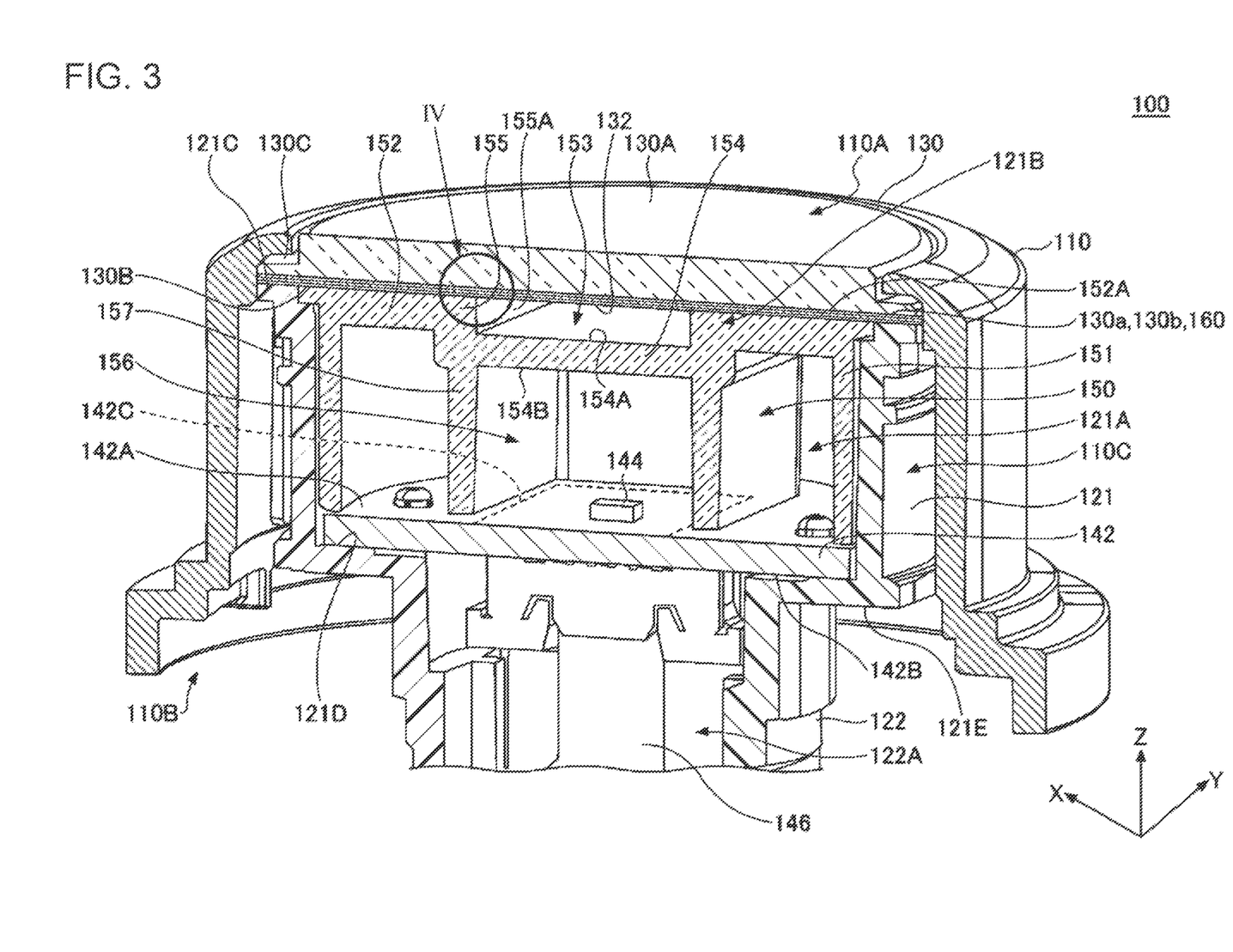
FIG. 3 is a cross-sectional view of the display apparatus according to an embodiment.
Figure 4:
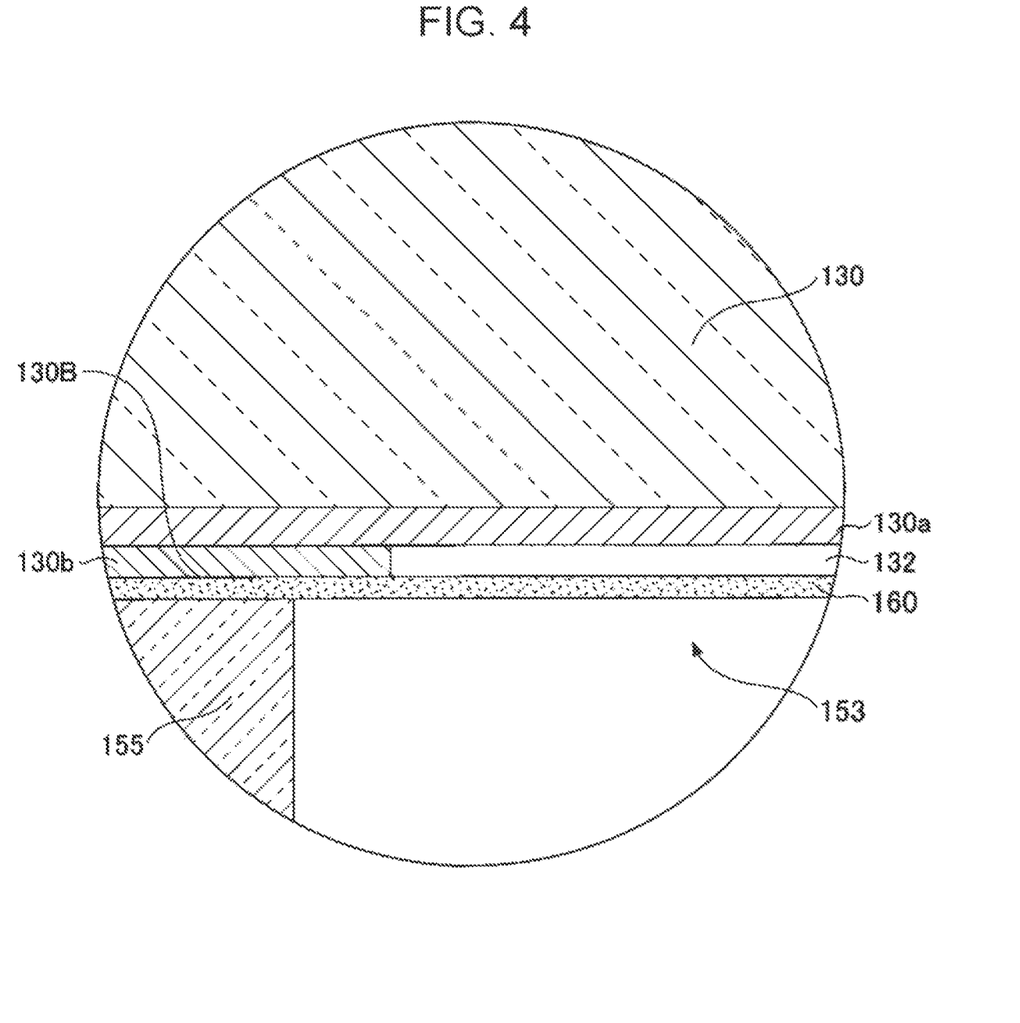
FIG. 4 is a partial enlarged view of part IV of the display apparatus shown in FIG. 3.

FIG. 1 is an external perspective view of a display apparatus 100 according to an embodiment. FIG. 2 is an exploded perspective view of the display apparatus 100 according to an embodiment. FIG. 3 is a cross-sectional view of the display apparatus 100 according to an embodiment. FIG. 4 is a partial enlarged view of part IV of the display apparatus 100 shown in FIG. 3. In the following description, the height direction of the display apparatus 100 (the direction in which a shaft 122 of a base 120 extends) is the Z-axis direction, and the directions perpendicular to the Z-axis direction are the X-axis direction and the Y-axis direction.

The display apparatus 100 shown in FIG. 1 is an example of application of "display apparatus". The display apparatus 100 is incorporated in a switching device (not shown) disposed at a position operable by a vehicle driver (for example, a center console) in the interior of a vehicle, such as an automobile. The switching device can be switched between an on-state and an off-state by a driver's push operation.

As shown in FIGS. 1 to 3, the display apparatus 100 includes a generally cylindrical knob 110. The top of the knob 110 has an upper opening 110A that is circular in plan view. The upper opening 110A is blocked by a disc-shaped lid 130 fitted therein.

The bottom of the knob 110 has a lower opening 110B that is circular in plan view. The columnar shaft 122 of the base 120 extends downward from the lower opening 110B. A flexible printed circuit (FPC) 146 extends downward from the bottom of the knob 110 along the shaft 122 of the base 120. The knob 110 is connected to the base 120. For example, the knob 110 and the base 120 may be made of various kinds of light-shielding resin material (for example, polybutylene terephthalate (PBT)) by injection molding.

When a light emitting diode (LED) 144 provided in the knob 110 is on, the display apparatus 100 displays a predetermined design shape (a simple circle in FIGS. 1 and 2, for example, a design shape designating the function of a switching device) on the upper surface 130A of the lid 130 by the light emitted from the LED 144 passing through a light-transmissive portion 132 of the lid 130. In contrast, when the LED 144 is off, the predetermined design shape is not visually recognized on the upper surface 130A of the lid 130 (as it is called "black-out").

Configuration of Display Apparatus 100

As shown in FIG. 2, the display apparatus 100 includes the knob 110, the lid 130, an adhesive tape 160, a light guide 150, a circuit unit 140, and the base 120.

The knob 110 is a generally cylindrical member having the upper opening 110A and the lower opening 110B. An inner space 110C of the knob 110 houses the lid 130, the adhesive tape 160, the light guide 150, the circuit unit 140, and a holding unit 121 integral to the base 120.

The lid 130 is a flanged disc-shaped member overlapped with an upper surface 121C of the holding unit 121 and an upper surface 152A of the light guide 150. The lid 130 blocks an upper opening 121B of the holding unit 121 from above. The lid 130 blocks the upper opening 110A when a flange 130C is fitted in the upper opening 110A of the knob 110 from below. The lid 130 is formed by injection-molding a light-transmissive resin material (for example, a polycarbonate resin or an acrylic resin). The lid 130 is an example of "display unit". As shown in FIG. 4, the lid 130 includes a light-shielding layer 130b formed by painting or printing the whole surface of a bottom surface 130B. However, the light-shielding layer 130b has, at the center, the light-transmissive portion 132 with a predetermined design shape in plan view so that the light-shielding layer 130b is not provided in conformity to the predetermined design shape. The lid 130 enables the predetermined design shape to be viewed when the light emitted from the LED 144 is applied from the bottom surface 130B and passes through the light-transmissive portion 132. As shown in FIG. 4, the lid 130 includes, higher than the light-shielding layer 130b including the light-transmissive portion 132, a smoked layer 130a which is formed by painting or printing and which covers the whole of the light-transmissive portion 132 and the light-shielding layer 130b. The smoked layer 130a is decreased in light transmittance by being colored in smoke color. This reduces the amount of disturbance light that enters the interior through the light-transmissive portion 132 when the LED 144 is off and makes it difficult for the light-transmissive portion 132 to be viewed from above. The bottom surface 130B of the lid 130 is bonded to the upper surface 121C of the holding unit 121 and the upper surface 152A of the light guide 150 with the adhesive tape 160. The adhesive tape 160 is made of an adhesive and light transmissive material.

Figure 5:
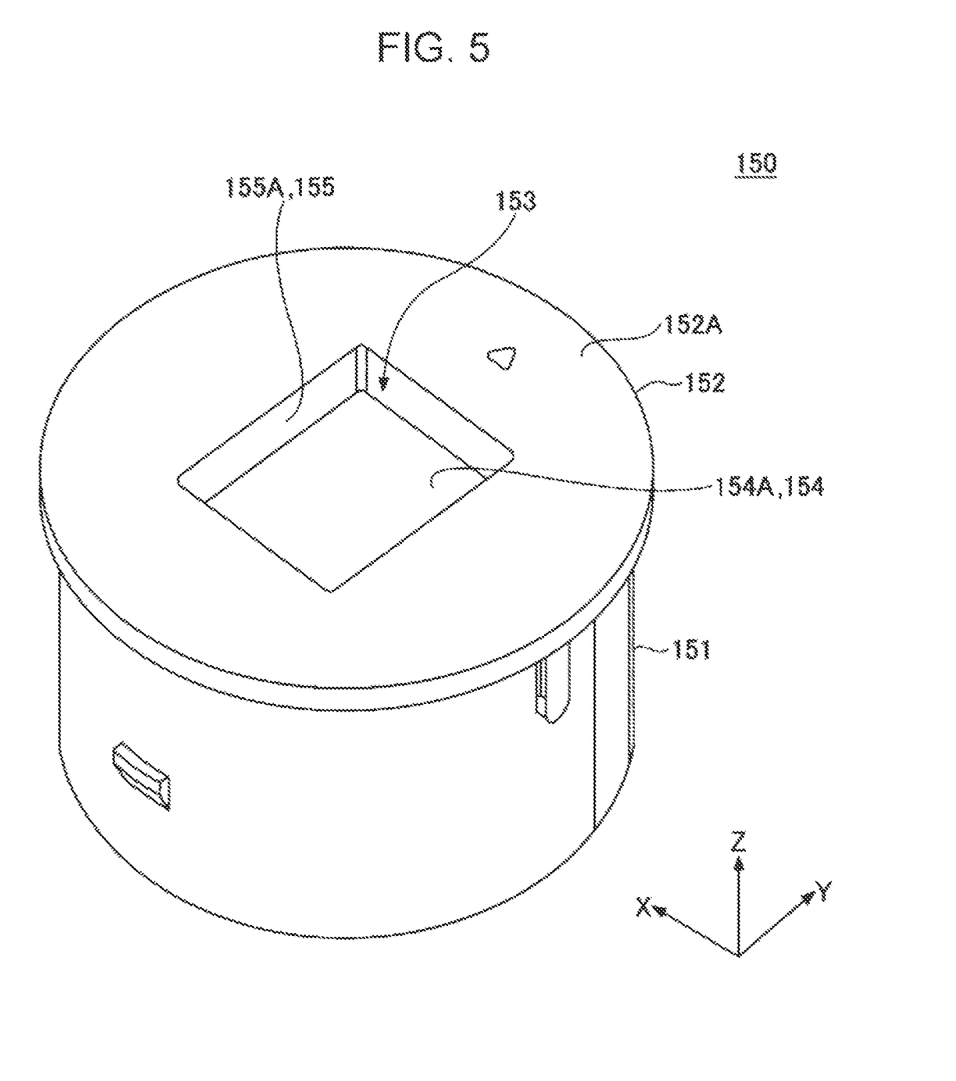
FIG. 5 is an external perspective view of a light guide according to an embodiment seen from the upper surface.
Figure 6:
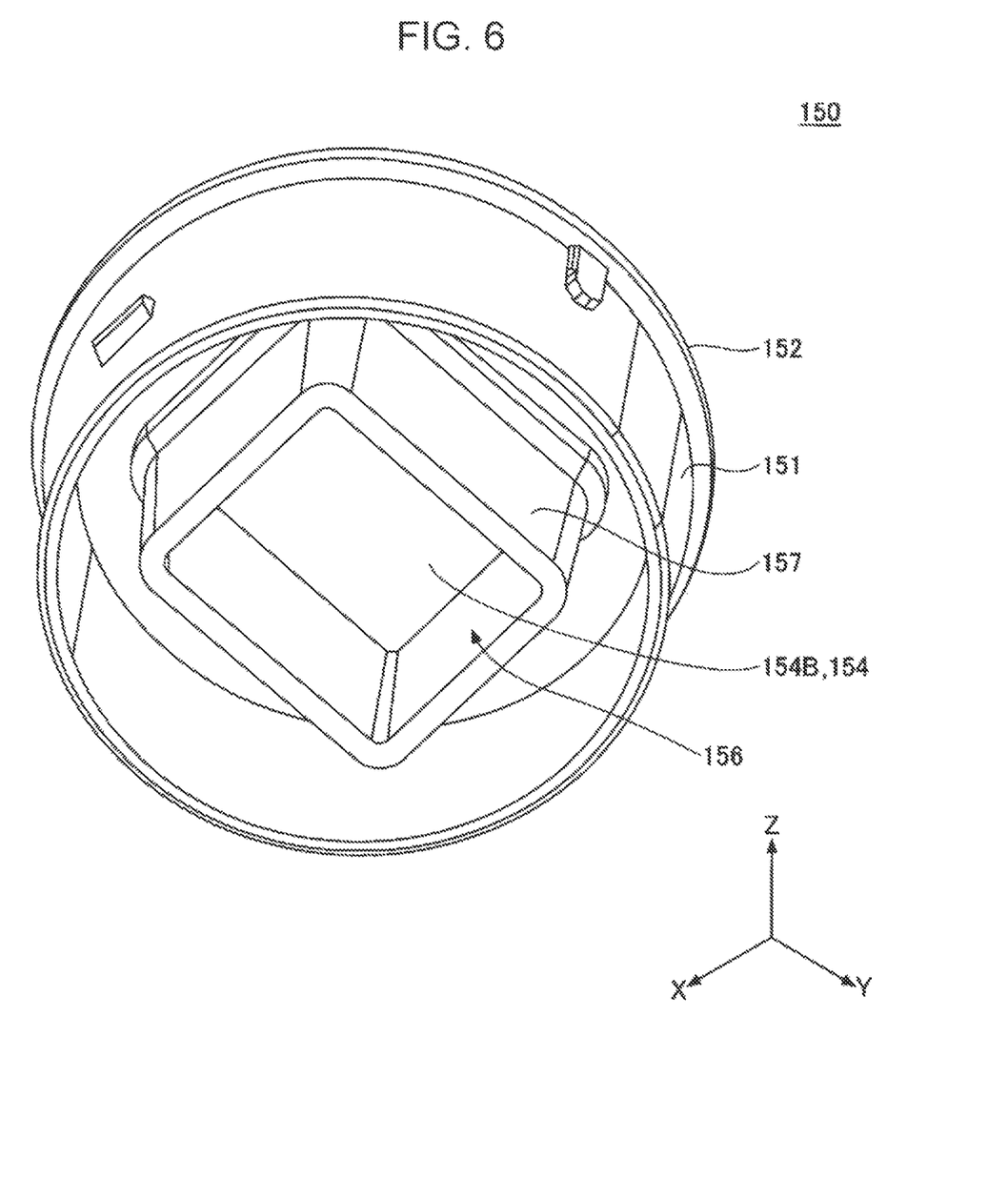
FIG. 6 is an external perspective view of the light guide according to an embodiment seen from the bottom surface.

The light guide 150 guides the light emitted from the LED 144 to the light-transmissive portion 132 of the lid 130. The configuration of the light guide 150 is further shown in FIGS. 5 and 6. FIG. 5 is an external perspective view of the light guide 150 according to an embodiment seen from the upper surface. FIG. 6 is an external perspective view of the light guide 150 according to an embodiment seen from the bottom surface. The light guide 150 has a generally columnar outer shape. Specifically, as shown in FIGS. 5 and 6, the light guide 150 includes a cylindrical outer peripheral wall 151 and a disc-shaped upper wall 152 that blocks the upper opening of the outer peripheral wall 151. The light guide 150 is made of a light-transmissive resin material (for example, a polycarbonate resin or an acrylic resin). In particular, the light guide 150 of this embodiment is made of a material containing a light diffusing agent.

The light guide 150 may include a first peripheral wall 157 that encloses a first space 156 described later. The light guide 150 further includes a second space 153 at the center of the upper wall 152 (that is, a position overlapping with the light-transmissive portion 132 of the lid 130 in plan view). The second space 153 is a rectangular space that is recessed downward from the upper surface 152A of the upper wall 152 and that encompasses the largest external form of the light-transmissive portion 132 in plan view.

The light guide 150 further includes a horizontal flat radiating portion 154 integrated with the bottom of the second space 153. An upper surface 154A of the radiating portion 154 is a rectangular horizontal flat surface in plan view. The upper surface 154A faces the second space 153 and opposes the light-transmissive portion 132 of the lid 130 with the second space 153 therebetween. The upper surface 154A is an example of "radiation surface". The upper surface 154A applies the light that is emitted from the LED 144 and guided to the radiating portion 154 by the light guide 150 toward the light-transmissive portion 132. In this embodiment, the upper surface 154A may be embossed (not shown). This allows the radiating portion 154 to diffuse and radiate the light from the upper surface 154A. The radiating portion 154 is spaced apart from an upper surface 142A of a circuit board 142 but lands on the upper surface 142A of the circuit board 142 via the first peripheral wall 157, a second peripheral wall 155, the upper wall 152, and the outer peripheral wall 151 of the light guide 150 integral to the radiating portion 154. Accordingly, in this embodiment, each or all of the first peripheral wall 157, the second peripheral wall 155, the upper wall 152, and the outer peripheral wall 151 integral to the light guide 150 correspond to an example of "supporting unit that supports the radiating portion". The display apparatus 100 of this embodiment can adjust the brightness of the predetermined design shape viewed on the lid 130 when the light guide 150 is on and balance with the influence of the internal reflection of disturbance light at light-off by adjusting the interval between the radiating portion 154 and the light-transmissive portion 132 by changing the position and the thickness or the like in the height direction of the supported radiating portion 154.

The light guide 150 has the second peripheral wall 155 that encloses the second space 153. The second peripheral wall 155 is a quadrangular cylindrical wall that is approximately vertically erected from the upper surface 154A of the radiating portion 154. The allows the display apparatus 100 according to an embodiment to apply the light emitted from the LED 144 toward the light-transmissive portion 132 also from the second peripheral wall 155.

The light guide 150 has the first space 156 below the radiating portion 154. The first space 156 is the space between a bottom surface 154B of the radiating portion 154 and the upper surface 142A of the circuit board 142 (a rectangular area 142C at the center of which the LED 144 is disposed).

The light guide 150 further has a first peripheral wall 157 that encloses the first space 156. The first peripheral wall 157 is a quadrangular cylindrical wall provided vertically downward from the bottom surface 154B of the radiating portion 154. The lower end of the first peripheral wall 157 is in contact with the upper surface 142A of the circuit board 142. This allows the display apparatus 100 according to an embodiment to prevent the light emitted from the LED 144 from leaking from between the lower end face of the first peripheral wall 157 and the upper surface 142A of the circuit board 142 and to introduce the light inside the first peripheral wall 157 or reflect the light upward from the first peripheral wall 157.

The circuit unit 140 controls the light emission of the LED 144. The circuit unit 140 includes the circuit board 142, the LED 144, and the FPC 146. The circuit board 142 is a disc-shaped member on which an electronic circuit is formed. The circuit board 142 is disposed on an inner bottom surface 121D of the holding unit 121 of the base 120. The circuit board 142 has the same circular shape as the shape of the inner bottom surface 121D in plan view and the same diameter as the diameter of the inner bottom surface 121D so as to tightly cover the inner bottom surface 121D of the base 120. An example of the circuit board 142 is a printed wired board (PWB).

The light emitting diode (LED) 144 is an example of "light source". The LED 144 is mounted at the center of the upper surface of the circuit board 142. The LED 144 emits light upward from the LED 144 by being driven by the electronic circuit formed on the circuit board 142. The electronic circuit formed on the circuit board 142 is electrically connected to the outside of the display apparatus 100 via the FPC 146. This allows the light emission from the LED 144 to be controlled from the outside of the display apparatus 100.

The FPC 146 is a belt-like flexible member. The FPC 146 electrically connects the electronic circuit formed on the circuit board 142 to the outside of the display apparatus 100. The FPC 146 extends from the bottom surface of the circuit board 142 downward through the interior of the shaft 122 of the base 120 and is taken out of the shaft 122 through the lower opening of the shaft 122. An example of the FPC 146 is a wire made of a filmy electrically conductive material (for example, copper foil) sandwiched between a pair of overlapping film members (for example, polyimide film).

The base 120 includes the holding unit 121 and the shaft 122. The base 120 is formed by injection molding a light-shielding resin material. The holding unit 121 is a generally cylindrical portion housed in the inner space 110C of the knob 110. The holding unit 121 is an example of "holding member". The holding unit 121 houses and holds the light guide 150, the circuit board 142, and the LED 144 in an inner space 121A. Specifically, the circuit board 142 is placed on the inner bottom surface 121D of the inner space 121A. In the inner space 121A, the light guide 150 is placed on the upper surface 142A of the circuit board 142. The upper opening 121B of the holding unit 121 is blocked by the upper surface 152A of the light guide 150 with the same shape (circular shape). This causes the upper surface 152A of the light guide 150 to be flush with the upper surface 121C of the holding unit 121. The bottom surface 130B of the lid 130 is bonded to the upper surface 121C of the holding unit 121 and the upper surface 152A of the light guide 150 with the adhesive tape 160. The shaft 122 is a cylindrical portion extending downward from a bottom surface 121E of the holding unit 121. As shown in FIG. 3, an inner space 122A of the shaft 122 communicates with the inner space 121A of the holding unit 121. The FPC 146 connected to a bottom surface 142B of the circuit board 142 passes through the inner space 122A of the shaft 122.

The display apparatus 100 according to an embodiment is configured such that the light emitted from the LED 144 enters the interior of the light guide 150, propagates through the interior of the light guide 150, and is applied from the upper surface 154A of the radiating portion 154 of the light guide 150 toward the light-transmissive portion 132 of the lid 130 at a position opposing the upper surface 154A. The light applied to the light-transmissive portion 132 passes through the light-transmissive portion 132 and exits upward from the upper surface 130A of the lid 130. This allows the predetermined design shape of the light-transmissive portion 132 to be viewed on the upper surface 130A of the lid 130.

The display apparatus 100 according to an embodiment can efficiently guide the light emitted from the LED 144 to the radiating portion 154 with the light guide 150.

In particular, the light guide 150 of the display apparatus 100 according to an embodiment includes the radiating portion 154 and a supporting portion that supports the radiating portion 154. In other words, the display apparatus 100 according to an embodiment is configured such that the radiating portion 154 and the supporting portion are integrated with the light guide 150. For this reason, the display apparatus 100 according to an embodiment does not need another member for supporting the radiating portion 154 at a predetermined height. This allows the display apparatus 100 according to an embodiment to reduce in the number of components, improving the ease of assembly.

In the display apparatus 100 according to an embodiment, the light guide 150 includes the first peripheral wall 157 that encloses the first space 156 between the radiating portion 154 and the LED 144.

This allows the display apparatus 100 according to an embodiment to make the light emitted from the LED 144 barely leak to the outside of the light guide 150 using the first peripheral wall 157. This also allows the light to enter the interior of the light guide 150 from the first peripheral wall 157 and to propagate through the interior of the light guide 150 and be reflect upward. Therefore, the display apparatus 100 according to an embodiment can efficiently apply the light emitted from the LED 144 to the light-transmissive portion 132.

In the display apparatus 100 according to an embodiment, the light guide 150 includes the second peripheral wall 155 that encloses the second space 153 between the radiating portion 154 and the light-transmissive portion 132.

This allows the display apparatus 100 according to an embodiment to apply the light to the light-transmissive portion 132 not only from the radiating portion 154 but also from the second peripheral wall 155. This allows the display apparatus 100 according to an embodiment to efficiently apply the light emitted from the LED 144 to the light-transmissive portion 132.

The display apparatus 100 according to an embodiment can change the height and the like of the first peripheral wall 157 and the second peripheral wall 155 to change the position, the thickness, and the like in the height direction of the radiating portion 154 supported by them. This allows adjusting the brightness of the predetermined design shape viewed on the lid 130 when the light guide 150 is on and balancing with the influence of the internal reflection of disturbance light at light-off by adjusting the interval between the radiating portion 154 and the light-transmissive portion 132.

An inner wall surface 155A of the second peripheral wall 155 (the wall surface facing the second space 153) is not limited to a vertical surface but may be an inclined surface inclined upward (toward the light-transmissive portion 132). This allows the second peripheral wall 155 to apply the light emitted from the LED 144 to the light-transmissive portion 132 more efficiently.

In the display apparatus 100 according to an embodiment, the light guide 150 may be made of a material containing a light diffusing agent.

This allows the display apparatus 100 according to an embodiment to diffuse and apply the light from the radiating portion 154, thereby applying the light uniformly to the light-transmissive portion 132. This eliminates the need for another diffusing member for diffusing the light, reducing the number of components to improve the ease of assembly.

The display apparatus 100 according to an embodiment further includes the holding unit 121 for the base 120 that houses the LED 144 and the light guide 150. The holding unit 121 may be made of a light-shielding material.

This allows the display apparatus 100 according to an embodiment to prevent the light emitted from the LED 144 from being exposed outside the holding unit 121. This allows the display apparatus 100 according to an embodiment to apply the light emitted from the LED 144 efficiently to the light-transmissive portion 132.

Having described an embodiment of the present invention, it is to be understood that the present invention is not limited to the embodiment and that various modifications and changes may be made within the spirit and scope of the claims of the present invention.

For example, while an example of application to the display apparatus of the present invention has been described in an embodiment, it is to be understood that the present invention is not limited to the example and is applicable to any components and apparatuses that enable a predetermined design shape to be viewed at least only when the light source is on.

What is claimed is:

1. A display apparatus comprising:
a light source;
a display unit comprising a light-transmissive portion having a predetermined design shape, the display unit enabling the design shape to be visually recognized when light emitted from the light source is applied from a bottom surface and passes through the light-transmissive portion; and
a light guide that guides the light emitted from the light source to the light-transmissive portion, the light guide comprising:
a radiating portion opposed to the light-transmissive portion at a position adjacent to a bottom surface of the display unit, the radiating portion applying the light emitted from the light source toward the light-transmissive portion;
a first peripheral wall enclosing a first space between the radiating portion and the light source;
a second peripheral wall enclosing a second space between the radiating portion and the light-transmissive portion;
an upper wall connecting to the second peripheral wall and extending outside the second space; and
an outer peripheral wall connecting to the upper wall and extending toward the bottom surface,
wherein each of the radiating portion, the first peripheral wall, the second peripheral wall, the upper wall, and the outer peripheral wall is integral to the light guide, and
wherein each or all of the first peripheral wall, the second peripheral wall, the upper wall, and the outer peripheral wall are supporting portions that support the radiating portion.

2. The display apparatus according to claim 1, wherein the light guide is made of a material containing a light diffusing agent.

3. The display apparatus according to claim 1, wherein a radiation surface of the radiating portion is embossed.

4. The display apparatus according to claim 1, further comprising:
a holding member that houses and holds the light source and the light guide,
wherein the holding member is made of a light-shielding material.

* * * * *